United States Patent
Tate et al.

(10) Patent No.: US 12,459,411 B2
(45) Date of Patent: Nov. 4, 2025

(54) VEHICULAR SEAT

(71) Applicant: Proprietect L.P., Toronto (CA)

(72) Inventors: Mark R. Tate, Toronto (CA); Joseph F. Landis, Macomb, MI (US)

(73) Assignee: Proprietect L.P., Toronto (CA)

( * ) Notice: Subject to any disclaimer, the term of this patent is extended or adjusted under 35 U.S.C. 154(b) by 0 days.

(21) Appl. No.: 18/384,155

(22) Filed: Oct. 26, 2023

(65) Prior Publication Data
US 2024/0051446 A1    Feb. 15, 2024

Related U.S. Application Data

(63) Continuation of application No. 17/601,988, filed as application No. PCT/CA2020/050508 on Apr. 16, 2020, now abandoned.

(51) Int. Cl.
| | |
|---|---|
| B60N 2/28 | (2006.01) |
| B60N 2/64 | (2006.01) |
| B60N 2/68 | (2006.01) |
| B60R 22/26 | (2006.01) |
| B60R 11/00 | (2006.01) |
| B60R 22/18 | (2006.01) |

(52) U.S. Cl.
CPC .......... B60N 2/68 (2013.01); B60N 2/2809 (2013.01); B60N 2/64 (2013.01); B60R 22/26 (2013.01); B60R 2011/0015 (2013.01); B60R 2022/1806 (2013.01); B60R 2022/266 (2013.01)

(58) Field of Classification Search
CPC ....... B60R 2022/266; B60R 2011/0015; B60R 2011/0036; B60N 2/2809; B60N 2002/363; B60N 2/68
See application file for complete search history.

(56) References Cited

U.S. PATENT DOCUMENTS

| | | |
|---|---|---|
| 6,095,604 A | 8/2000 | Stack et al. |
| 6,959,954 B2 | 11/2005 | Brandt et al. |
| 8,096,621 B2 | 1/2012 | Braun |

(Continued)

FOREIGN PATENT DOCUMENTS

| | | |
|---|---|---|
| CN | 103724965 A | 4/2014 |
| CN | 110293886 A | 10/2019 |

(Continued)

OTHER PUBLICATIONS

International Search Report, with a mailing date of Aug. 18, 2020, in International application No. PCT/CA2020/050508, filed on Apr. 16, 2020 (30 pages).

*Primary Examiner* — Timothy J Brindley
(74) *Attorney, Agent, or Firm* — McAndrews, Held & Malloy, Ltd.; Michael S. Tomsa

(57) ABSTRACT

Described is a vehicular seat having a back element. The back element includes: (a) a rigid support element having coupled thereto an anchor element, the anchor element for detachably coupling to an article; and (b) a resilient foam element secured with respect to the rigid support element. The resilient foam element is in contact with the back of an occupant of the vehicular seat. The article can be one or more of an occupant restraint element, a cargo element and an automotive accessory. Advantageously, this combination of elements results in a vehicular seat, which is of light weight construction and passes the FMVSS 225 test requirement.

22 Claims, 5 Drawing Sheets

(56) References Cited

U.S. PATENT DOCUMENTS

| | | | |
|---|---|---|---|
| 10,220,790 B2 | 3/2019 | Mozurkewich et al. | |
| 2007/0176480 A1 | 8/2007 | Brunner | |
| 2009/0315369 A1* | 12/2009 | Hirschkorn | B60N 2/2812 |
| | | | 297/216.11 |
| 2012/0146369 A1* | 6/2012 | Gaudreau, Jr. | B60N 2/2809 |
| | | | 297/216.11 |
| 2013/0119722 A1* | 5/2013 | Spahn | B60N 2/286 |
| | | | 297/216.11 |
| 2015/0321591 A1 | 11/2015 | Kuhley et al. | |
| 2020/0331401 A1 | 10/2020 | Yilma et al. | |
| 2021/0229626 A1* | 7/2021 | Demirovic | B60R 22/26 |
| 2023/0226995 A1* | 7/2023 | Somekawa | B60R 22/18 |
| | | | 297/468 |

FOREIGN PATENT DOCUMENTS

| | | |
|---|---|---|
| DE | 102011087054 A1 | 5/2013 |
| DE | 102017106551 A1 | 12/2017 |
| FR | 2868023 A1 | 9/2005 |
| JP | 2001122005 A | 5/2001 |
| WO | 99/28107 A1 | 6/1999 |
| WO | 2015159960 A1 | 10/2015 |
| WO | 2021005141 A1 | 1/2021 |

* cited by examiner

VEHICULAR SEAT

RELATED APPLICATIONS

The present application is a continuation application of U.S. patent application Ser. No. 17/601,988, filed Oct. 7, 2021, which is a National Phase Entry of PCT International Application No. PCT/CA2020/050508, which was filed on Apr. 16, 2020, and claims the benefit under 35 U.S.C. § 119(e) of U.S. provisional patent application No. 62/835,283, filed Apr. 17, 2019, the contents of which are hereby incorporated by reference.

BACKGROUND

The present disclosure relates to a vehicular seat. More particularly, the present disclosure relates to a vehicular seat comprising a back element comprising a rigid foam element.

Passenger seats in vehicles, such as automobiles, are typically fabricated from a foam (usually polyurethane) material, which is molded into the desired shape and covered with an appropriate trim cover. The foamed material is selected to provide passenger comfort by providing a resilient seat and the trim cover is selected to provide the desired aesthetic properties.

It is known in the art that, while the resiliency of the foamed material in the seat provides passenger comfort, it does not provide the necessary structural strength for the seat. This necessitates additional reinforcement of the seat to provide the degree of structural strength required to ensure proper mounting of the seat within the vehicle and proper support of anti-submarine elements. Accordingly, prior art vehicular seats typically include a perimeter frame of metal, which strengthens the seat. Further, support rails are typically mounted across the metal frame to stiffen the frame and to provide a suitable attachment point for the means used to anchor the seat to the vehicle. Conventionally, the metal frame and/or support rails are substantially completely embedded in the foam material when the seat is molded. In many cases, the metal frame will further comprise a plurality of apertures or other means for attaching a trim cover to the seat.

Of course, the requirement for such a perimeter metal frame and for support rails adds to the cost of manufacturing the seat and, more importantly, adds to the weight of the seat and the overall weight of the vehicle in which it is installed. This added weight increases both the cost of shipping the seat to the vehicle manufacturer and the eventual lifetime operating expense for the vehicle. Finally, the presence of metal frame and support rails or other components in the seat hampers the eventual recycling of the seat materials, which is becoming increasingly important in today's environmentally concerned marketplace.

U.S. Pat. Nos. 5,400,490 and 5,542,747 [collectively the Burchi patents], issued Mar. 28, 1995 and Aug. 6, 1996, respectively, describe a passenger seat comprising a frame element molded from relatively high density, rigid foam; vehicle anchorage means connected to the frame element; and a seat body comprising a resilient material fixed with respect to the frame element. The provision of a frame element molded from relatively high density, rigid foam obviates the need for a conventional metal frame. The '490 and '747 patents also teach application of a trim cover to passenger seat. The trim cover may be attached using push pins or a combination of bottom flaps (see FIGS. 3 and 9 in the '490 and '747 patents) with conventional mechanical attachment means (e.g., Velcro™, J-retainers or push pins).

While the disclosure taught in the Burchi patents represented a significant advance in the art, there is still room for improvement.

In recent years, sports utility vehicles (SUVs) and hatchback style automobiles have become very popular. These vehicles typically do not a conventional trunk and therefore the back of the rear seats of the vehicles are exposed to the cargo area.

These conventional rear seat backs typically include a metal frame, which is secured with respect to resilient foam body, which contacts the occupant of the rear seat. The metal frame is coupled the body of the vehicle and/or to the seat bottom portion of the vehicular seat. It is conventional for all vehicles to place child seats in the rear seats and tether those child seats to the exposed seatback in SUVs or hatchback vehicles (e.g., via a clip or other mechanical arrangement). The tether of the child seat is clipped into a (that is connected to the steel frame of the seatback).

Applying the approach in the above-mentioned Burchi patents to SUVs or hatchback vehicles is problematic since elimination of the metal frame from conventional seatbacks results in elimination of the attachment point to the tether of a child seat.

Thus, it would be desirable to be able to implement the so-called "frameless" (i.e., no metal frame in seat back) approach taught in the Burchi patents to a vehicular seatbacks such as the one used in SUVs or hatchback vehicles while eliminating the metal frame from the seatback and having the resultant seatback pass current safety requirements such as the FMVSS 225 test—i.e., to withstand failure of the connection between the child seat and the vehicular seat (the seat back in the case).

SUMMARY

It is an object of the present disclosure to obviate or mitigate at least one of the above-mentioned disadvantages of the prior art.

It is another object of the present disclosure to provide a novel vehicular seat.

Accordingly, in one of its aspects, the present disclosure provides a vehicular seat comprising a back element, the back element comprising: a rigid support element having coupled thereto an anchor element, the anchor element configured to be detachably coupled to an article; and a resilient foam element secured with respect to the rigid support element, the resilient foam element configured to be in contact with the back of an occupant of the vehicular seat.

Thus, the present inventor has discovered a combination of elements which allows for implementation of the "frameless" seat approach in the above-mentioned Burchi patents without the need of using a metal frame element of the one hand while providing an anchor portion for detachable coupling to an article. Advantageously, this combination of elements results in a vehicular seat which is of light weight construction and, when the article is a child vehicular seat, passes the FMVSS 225 test requirement. Other advantages would be apparent to those of skill in the art upon review of the present specification.

Preferred embodiments of the disclosure will be described below with reference to the situation when the article is a child vehicular seat. However, it would be appreciated that the disclosure can be applied to other situations where it is desired to detachable couple an article to the vehicular seat. The article can be selected from an occupant restraint element, a cargo element and an automotive accessory. Non-limiting examples of an automotive accessory include a vehicular jack; a cargo mesh element; an audio system; a child vehicular seat; a child vehicular seat booster and the like.

DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
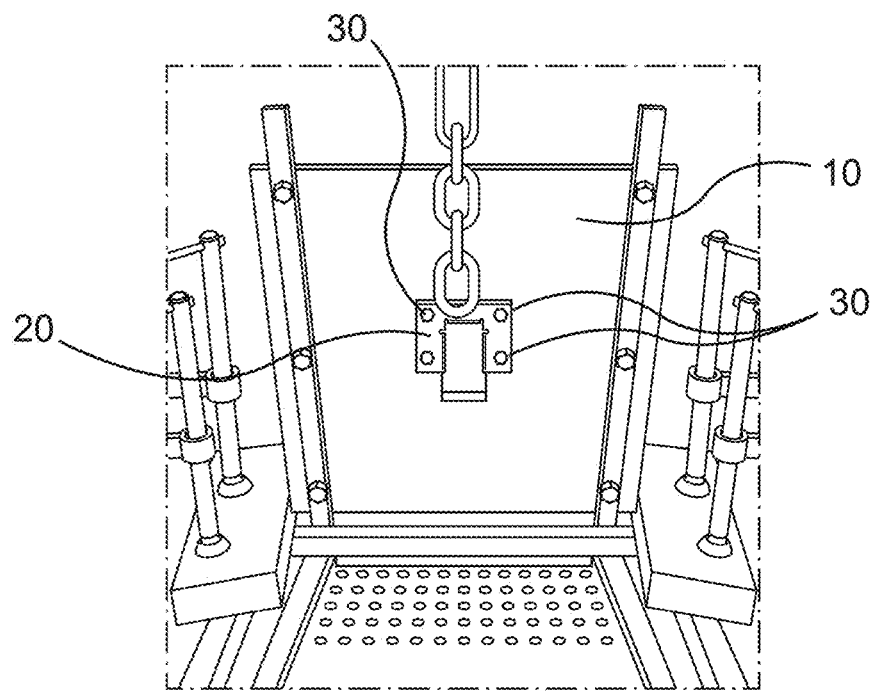
FIGS. 1 and 2 illustrate a preferred embodiment of a portion of the present vehicular seat.

The present disclosure relates to a vehicular seat comprising a back element, the back element comprising: a rigid support element having coupled thereto an anchor element, the anchor element configured to be detachably coupled to an article; and a resilient foam element secured with respect to the rigid support element, the resilient foam element configured to be in contact with the back of an occupant of the vehicular seat. Preferred embodiments of this vehicular seat may include any one or a combination of any two or more of any of the following features:
- the article is one or more of an occupant restraint element, a cargo element and an automotive accessory;
- automotive accessory is a vehicular jack;
- the automotive accessory is a cargo mesh element
- automotive accessory is an audio system;
- the automotive accessory is a child vehicular seat;
- the automotive accessory is a child vehicular seat booster;
- the rigid support element has a density in the range of from about 1000 grams per square meter to about 5000 per square meter;
- the rigid support element has a density in the range of from about 1500 per square meter to about 3500 per square meter;
- the rigid support element has a thickness in the range of from about 5 mm to about 25 mm;
- the rigid support element has a thickness in the range of from about 10 mm to about 18 mm;
- at least a portion of the anchor element is molded into the rigid support element;
- the anchor element is coupled to the rigid support element with an adhesive;
- the anchor element is mechanically coupled to the rigid support element;
- the vehicular seat further comprises at least one fastener element configured to mechanically couple the anchor element to the rigid support element;
- the vehicular seat further comprises at a plurality of fastener elements, each fastener element configured to mechanically couple the anchor element to the rigid support element;
- the fastener element comprises a push pin;
- the fastener element comprises a rivet;
- the fastener element comprises a rivet nut;
- the fastener element comprises a screw;
- the anchor element comprises at least one first flange portion configured to have a first flange major portion aligned substantially perpendicular with respect to the rigid support element major surface;
- the at least one first flange portion is configured to be in contact with an inner surface of the rigid support element;
- the anchor element comprises a plurality of first flange portions;
- the anchor element comprises at least one second flange portion configured to have a second flange major portion aligned substantially parallel with a rigid support element major surface;
- anchor element comprises a plurality of second flange portions, each second flange portion configured to have a second flange major portion aligned parallel with a rigid support element major surface;
- second flange major portion is configured to be in contact with an outer surface of the rigid support element;
- the anchor element comprises a plurality of second flange portions;
- the anchor element has a substantially U-shaped configuration;
- the U-shaped configuration comprises a cross member interconnect to side members;
- the cross member comprises a major axis substantially parallel to a top edge of the rigid support element;
- wherein the anchor member comprises an attachment portion for coupling to the article;
- the anchor member comprises an attachment portion for coupling to a tether element of a child vehicular seat;
- the attachment portion comprises a cross bar element;
- the attachment portion comprises a loop element;
- the attachment portion comprises a buckle element
- the attachment portion comprises a clip element;
- the attachment portion is constructed from a ductile material;
- the attachment portion is constructed from a metal material;
- the anchor element is a unitary element;
- the anchor element comprises a first anchor portion and a second anchor portion coupled to each other the first anchor portion and the second anchor portion contact opposed major surfaces of the rigid support element;
- the rigid support element is free of a metal frame element;
- the rigid support element comprises a rigid foam element;
- the rigid foam element has a density in the range from about 1.5 to about 24 pcf;
- the rigid foam element has a density in the range from about 2.5 to about 12 pcf;
- the rigid foam element has an indentation force deflection at 25% deflection of from about 200 pounds to about 4,000 pounds when measured pursuant to ASTM 3574-B1;
- the rigid foam element has an indentation force deflection at 25% deflection of from about 500 pounds to about 2,500 pounds when measured pursuant to ASTM 3574-B1;

the rigid foam element has an indentation force deflection at 25% deflection of from about 900 pounds to about 2,000 pounds when measured pursuant to ASTM 3574-B1;

the rigid foam element has a specific gravity of less than about 0.40;

the rigid foam element has a specific gravity in the range of from about 0.10 to about 0.25;

the rigid foam element comprises an isocyanate-based polymer foam;

the rigid foam element comprises polyurethane foam;

the rigid foam element comprises expanded polypropylene;

the rigid foam element comprises expanded polyethylene;

the rigid foam element comprises expanded polystyrene;

the rigid foam element further comprises a pair of opposed reinforcing layers, each reinforcing layer coupled to a major surface of the rigid foam element;

the rigid support element is a laminate comprising a core layer interposed between a pair of opposed reinforcing layers, each reinforcing layer coupled to a major surface;

the core layer is a non-foam core layer;

the core layer is a non-foam core layer has a substantially honeycomb configuration;

the core layer is a non-foam core layer has a substantially honeycomb configuration such that walls in the honeycomb configuration are oriented transverse to the pair of opposed reinforcing layer;

core layer is a non-foam core layer has a substantially honeycomb configuration such that walls in the honeycomb configuration are oriented orthogonal to the pair of opposed reinforcing layer;

each reinforcing layer comprises a fibrous reinforcing layer;

each reinforcing layer comprises a fiberglass reinforcing layer;

the resilient foam element comprises an isocyanate-based foam;

the resilient foam element comprises a polyurethane foam;

the resilient foam element has a density in the range of from about 1.5 pcf to about 4.5 pcf;

the resilient foam element has an indentation force deflection at 25% deflection of from about 15 pounds to about 175 pounds when measured pursuant to ASTM 3574-B1;

the rigid support element and the resilient secured to one another by an adhesive;

the rigid support element and the resilient secured to one another by a mechanical faster;

the vehicular seat further comprises a trim cover;

the trim cover is configured to substantially all cover exposed surfaces of the resilient foam element;

the trim cover is configured to secure the resilient foam element to the rigid support element; and/or the trim cover fastened to the rigid support element thereby to secure the resilient foam element to the rigid support element.

The present vehicular seat comprises a back element. The back element comprises a rigid support element having coupled thereto an anchor portion.

In one preferred embodiment, the rigid support element is an engineered board comprising rigid foam core such as a polyurethane foam. Non-limiting and preferred examples of suitable polyurethane foams for use in producing the rigid foam element are available from Woodbridge Foam Corporation under the tradename Stratas™. In a highly preferred embodiment, the rigid foam core is interposed between a pair of fibrous reinforcing layers secured to major surfaces of the foam core.

Generally, the polyurethane foam suitable for use in producing the rigid foam element and having the requisite characteristics may be produced from the following general non-limiting formulation (all parts are parts by weight):

| Component | Amount |
| --- | --- |
| Polymer polyol | 100-0 parts |
| Polyol | 0-100 parts |
| Crosslinker | 0-30 parts/100 parts polyol |
| Catalyst | 0.05-3.5 parts/100 parts polyol |
| Silicone surfactants | 0-1.5 parts/100 parts polyol |
| Water | 0.5-3.5 parts/100 parts polyol |
| Isocyanate | Adequate quantity for an index of from about 0.60 to about 1.30 ratio of NCO equivalents of NCO reactive sites |

Suitable polymer polyols, polyols and isocyanates are described in U.S. Pat. Nos. 3,304,273, 3,383,351, 3,523,093, 3,939,106 and 4,134,610, Belgian patent 788,115, Canadian Patent 785,835 and "Polymer/Polyols, a New Class of Polyurethane Intermediate", Kuryla, W. C. et al., J. Cellular Plastics, March (1966). Suitable crosslinkers, catalysts and silicone surfactants are described in U.S. Pat. Nos. 4,107,106 and 4,190,712.

The preferred foam suitable for use in producing the rigid foam element may be produced from the following formulation:

| Component | Amount |
| --- | --- |
| Polymer polyol | 100-20 parts |
| Polyol | 0-80 parts |
| Crosslinker | 5-15 parts/100 parts polyol |
| Catalyst | 0.5-1.2 parts/100 parts polyol |
| Silicone surfactants | 0.3-1.1 parts/100 parts polyol |
| Water | 1.75-2.75 parts/100 parts polyol |
| Isocyanate | Adequate quantity for an index of from about 0.80 to about 1.10 ratio of NCO equivalents of NCO reactive sites. |

In another preferred embodiment, the rigid support element comprises a composite laminate structure, which need not necessarily comprise a foam core. An example of such a composite laminate structure is commercially available Covestro under the tradename Baypreg™.

The present vehicular seat also comprises a resilient foam element secured with respect to the rigid foam element, the resilient foam element configured to be in contact with the back of an occupant of the vehicular seat. Preferably, the resilient foam element is a polyurethane foam, more preferably as so-called high resilience (HR) polyurethane foam.

Preferably, the foamable polymeric composition comprises a polyurethane derived from a diphenylmethane diisocyanate (MDI)-based system of low index and of a high molecular weight conventional polyol. Such a system is typically completely "water blown" using highly-catalyzed odorless amines and a cell regulator. Typically, this system cures at room temperature in about 3 minutes or less. Alternatively, the polyurethane is a tolylene diisocyanate (TDI)-based system of low index and of a high molecular weight conventional polyol. When such a TDI-based system is used, the cells of the foam in the finished padded element must be substantially open. Opening of such foam cells is within the purview of a person skilled in the art and can be accomplished by any convenient means such as crushing, kneading, roll pressing, chemical treatment and the like of the padded element while ensuring that the trim cover is not damaged during this step. It will be appreciated that the liquid foamable polymeric composition may comprise a mixture of MDI-based and TDI-based systems.

A preferred combination of the rigid foam element and the resilient foam element is commercially available from Woodbridge Foam Corporation under the tradename StructureLite™.

The back element of the present vehicular seat further comprises an anchor portion that is configured to be coupled to an article such as a tether element of a child vehicular seat. Preferred features of the anchor portion have been described above. The following description of anchor portion is a preferred embodiment in the context of testing done by the inventor.

Figure 2:
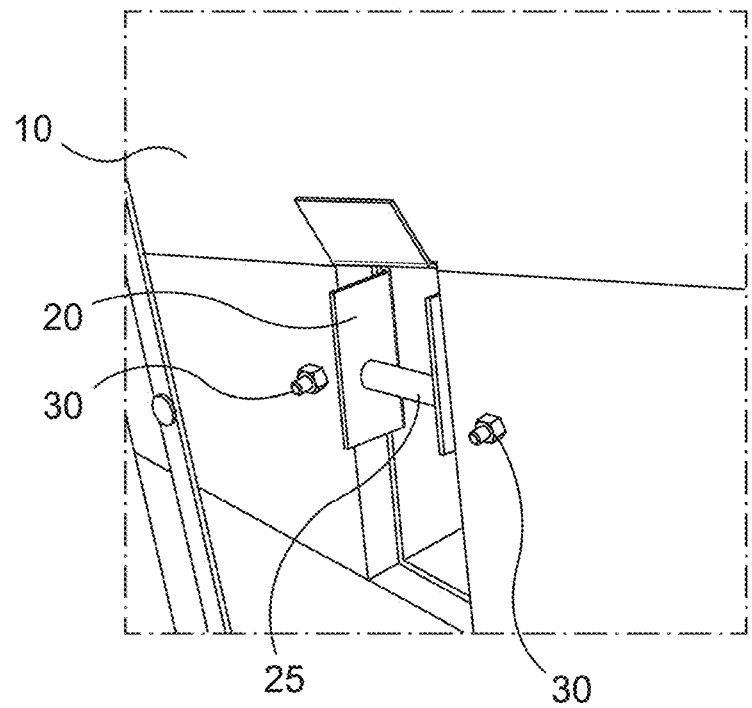
Figure 3:
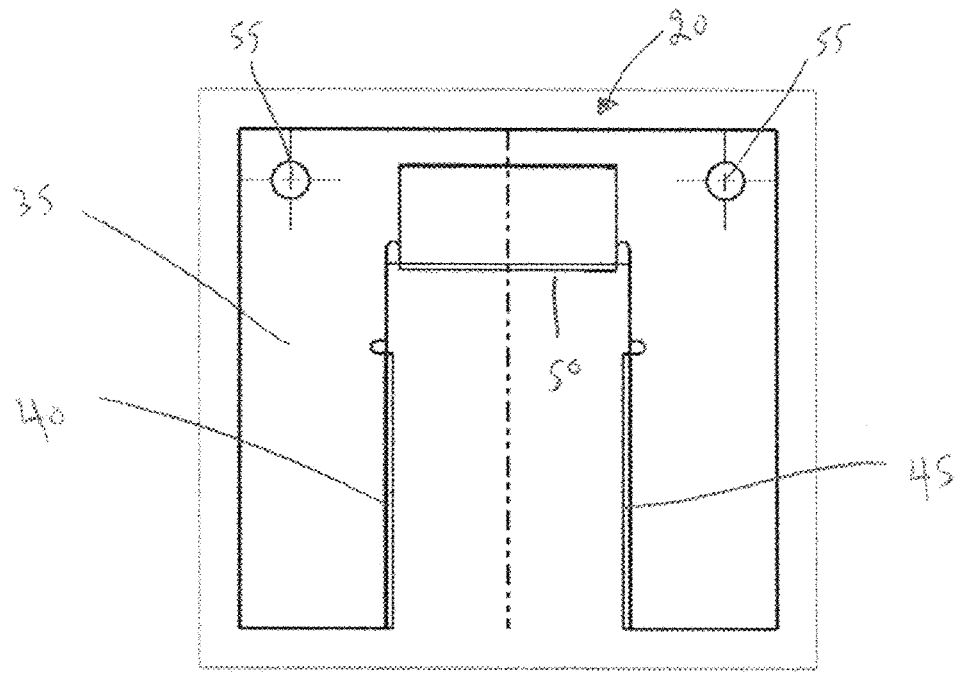
FIG. 3 illustrates a top view of a preferred embodiment of the anchor portion used in the present vehicular seat.
Figure 4:
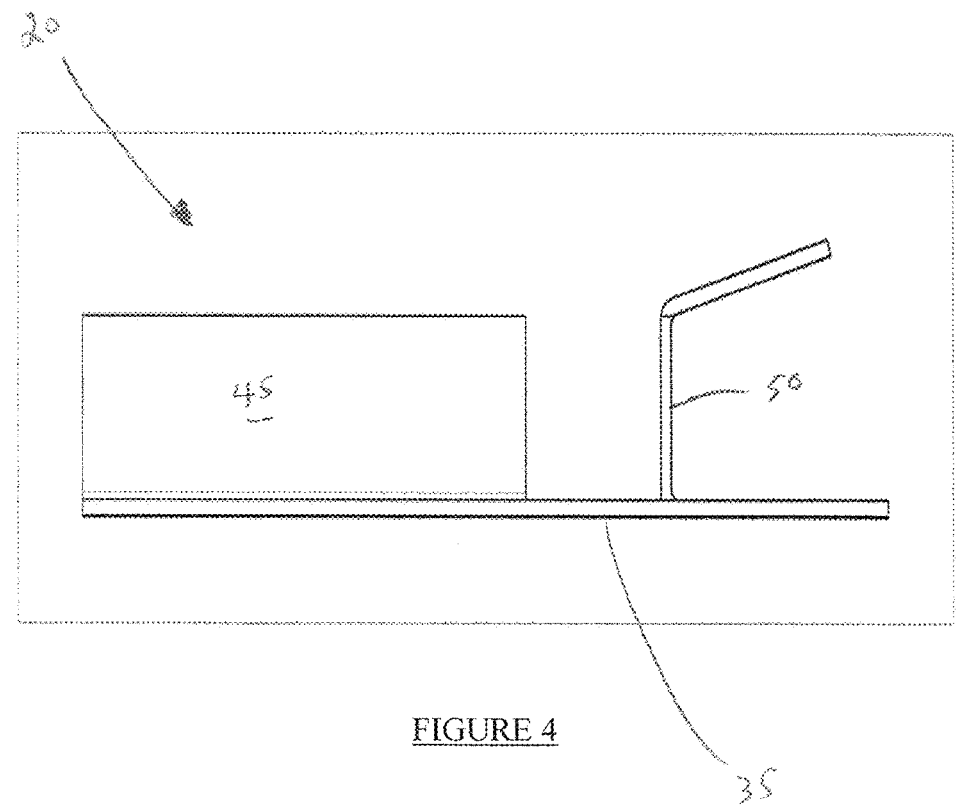
FIG. 4 illustrates a side view of the anchor portion illustrated in FIG. 3.
Figure 5:
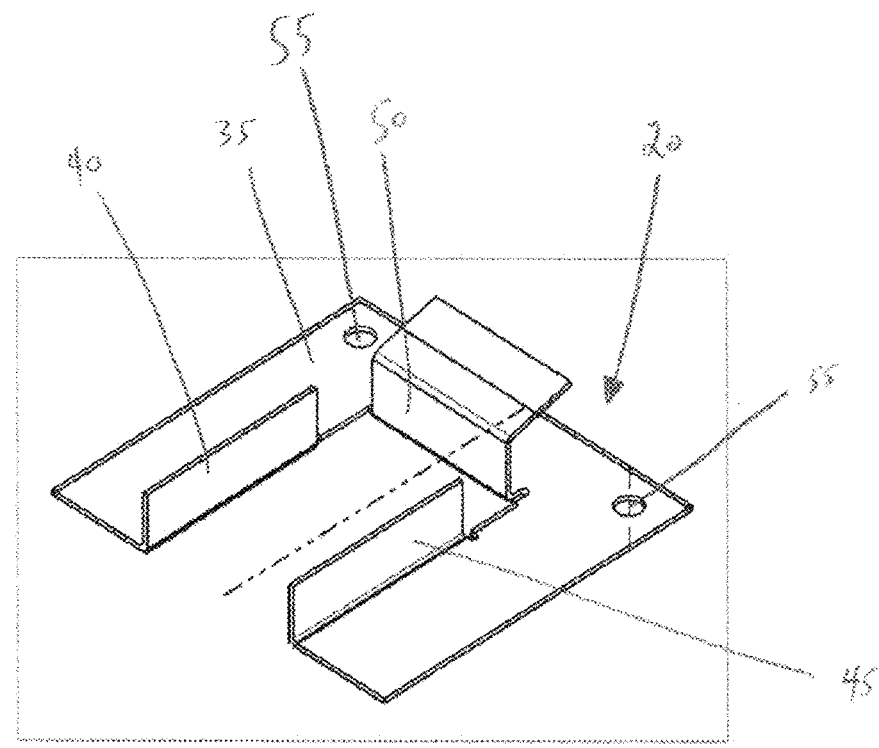
FIGS. 5 and 6 illustrate isometric views of of the anchor portion illustrated in FIG. 3.
Figure 6:
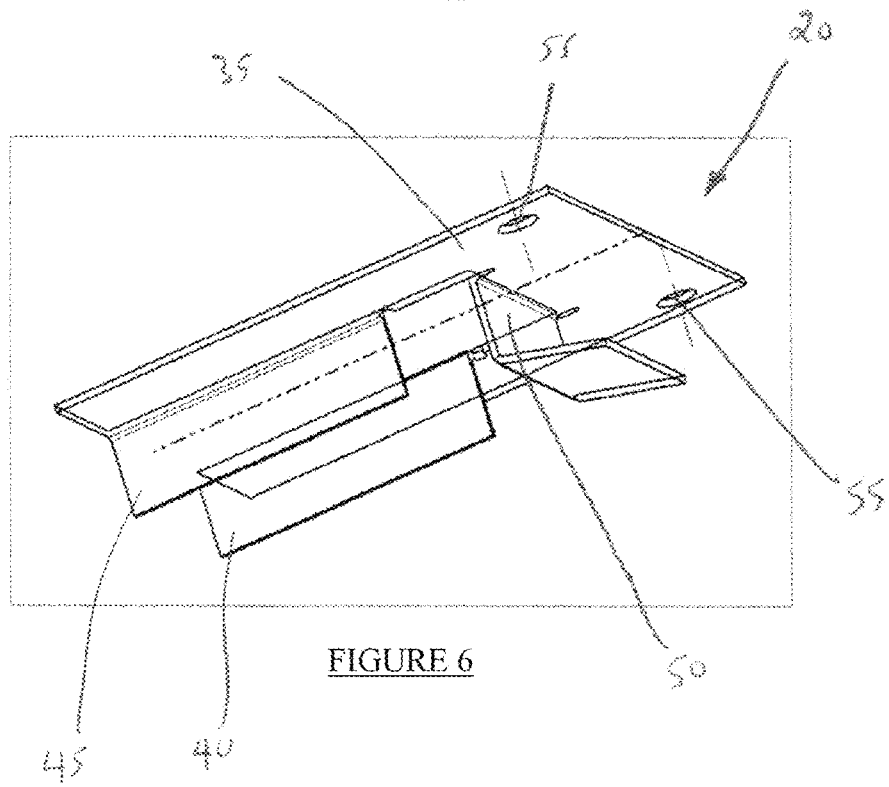

With reference to FIGS. 1-2, there is illustrated a rigid foam element 10. An anchor portion 20 is coupled to rigid foam element 10 in a central portion of the latter. FIG. 2 illustrates an enlarged view from the opposite side of rigid foam element 10 shown in FIG. 1. As can be seen, anchor portion 20 comprises a crossbar 25. Crossbar 25 is configured to be coupled to a tether portion of a child vehicular seat (not shown for clarity).

Anchor portion 20 is secured to rigid foam element 10 by a series of push pins 30.

FIGS. 3-6 illustrate various views of anchor portion 20 wherein crossbar 25 has been omitted for clarity.

Thus, anchor portion 20 comprises a body portion 35 for contact with rigid foam element 10. Anchor portion 20 further comprises a pair of opposed flange portions 40, 45 that are configured to contact the side of an aperture in rigid foam element 10 that is configured to receive anchor portion 20.

Anchor portion 20 further comprises a top flange portion 50 also configured to contact an aperture in rigid foam element 10 configured to receive anchor portion 20.

Anchor portion 20 further comprises apertures 55, which are configured to receive pushpins 30 to secure anchor portion 20 to rigid foam element 10.

Figure 7:
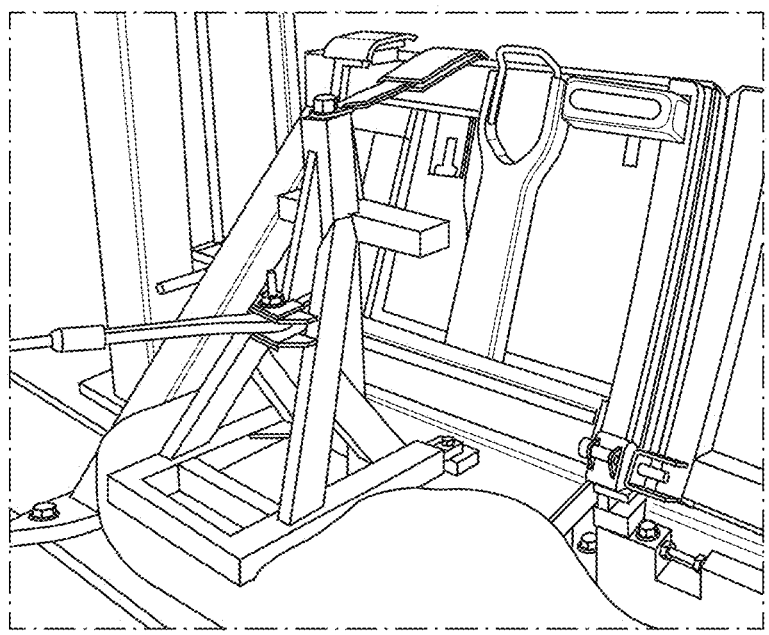
FIGS. 7 and 8 illustrate testing of a preferred embodiment of the back element of the present vehicular seat.
Figure 8:
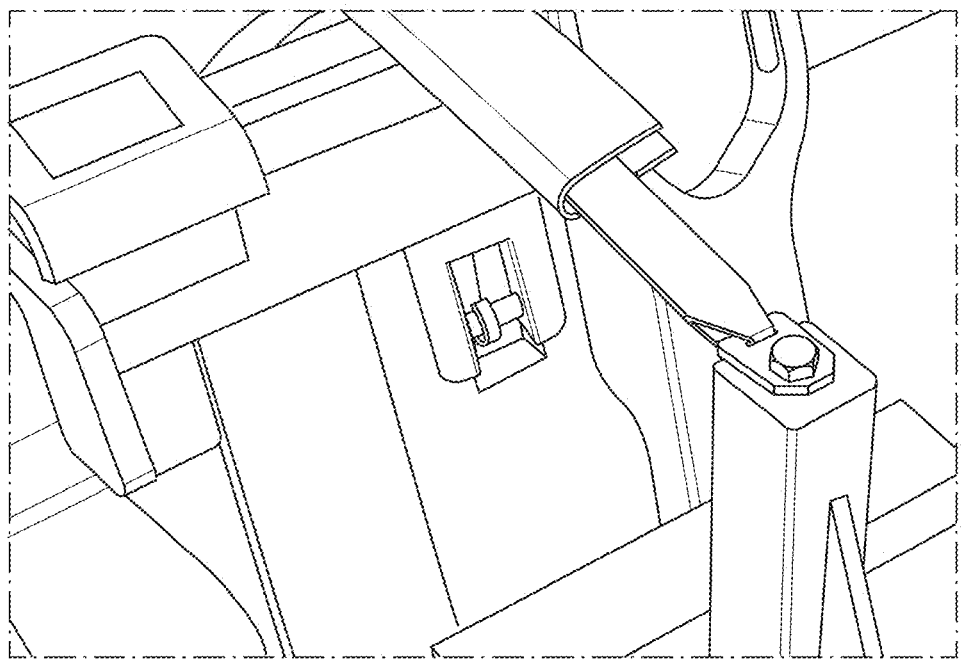
Figure 9:
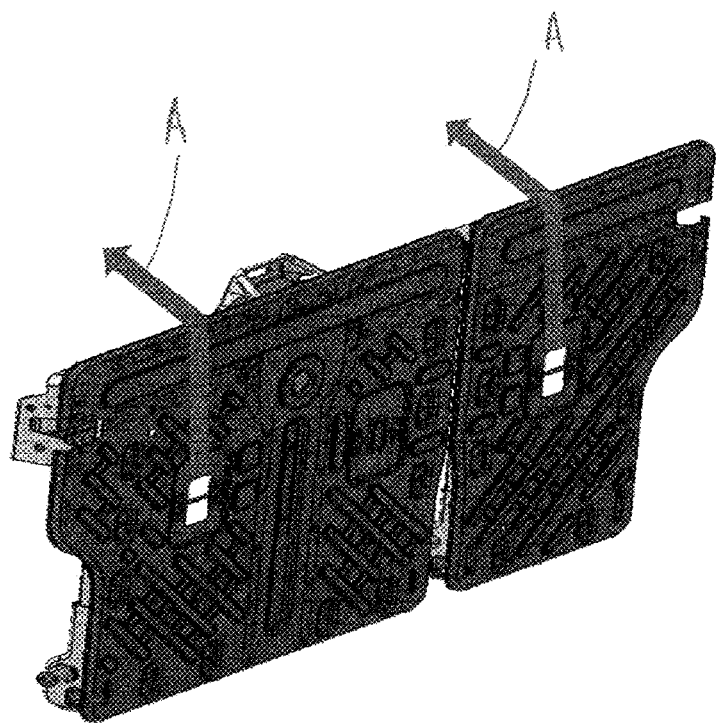
FIG. 9 illustrates the forces applied to the back element in the testing done with reference to FIGS. 7 and 8.

FIGS. 7-8 illustrate a test rig used for testing the embodiment used in FIGS. 1-2 for compliance with (FMVSS 225) regulatory testing). As shown, a testing rig mimics the forces applied to the seatback during a frontal crash. The purpose of the test to assess whether a particular combination of rigid foam element and anchor portion can withstand vertically applied load of 17.5 kN for 2 seconds (30 seconds ramp up) where the 17.5 kN load is distributed between 3 anchor points. The force applied to the seatback can be seen schematically in FIG. 9 with reference to arrows A.

The result of the test was that anchor portion 20 remained secured to rigid foam element 10 at the conclusion of the test. There was no failure observed in the test.

Based on these test results, the inventors have a reasonable basis to predict that similar results would be seen for different rigid foam elements and different designs of the anchor portion. Further, it is believed similar results would be seen once rigid foam element 10 is coupled to a resilient foam element in a vehicular seat where the anchor portion is coupled to the rigid foam element.

While this disclosure has been described with reference to illustrative embodiments and examples, the description is not intended to be construed in a limiting sense. Thus, various modifications of the illustrative embodiments, as well as other embodiments of the disclosure, will be apparent to persons skilled in the art upon reference to this description. It is therefore contemplated that the appended claims will cover any such modifications or embodiments.

All publications, patents and patent applications referred to herein are incorporated by reference in their entirety to the same extent as if each individual publication, patent or patent application was specifically and individually indicated to be incorporated by reference in its entirety.

What is claimed is:

1. A vehicular seat comprising a back element, the back element comprising:
   (a) a rigid foam element having coupled thereto an anchor element, the anchor element configured to be detachably coupled to an article; and
   (b) a resilient foam element secured with respect to the rigid foam element, the resilient foam element configured to be in contact with a back of an occupant of the vehicular seat;
   wherein the anchor element comprises an attachment portion for coupling to the article, the attachment portion being constructed of a ductile material.

2. The vehicular seat defined in claim 1, wherein the article is one or more of an occupant restraint element, a cargo element, and an automotive accessory.

3. The vehicular seat defined in claim 1, wherein the rigid foam element has a density in the range of from 1,000 grams per square meter to about 5,000 per square meter.

4. The vehicular seat defined in claim 1, wherein the rigid foam element has a thickness in the range of from about 5 mm to about 25 mm.

5. The vehicular seat defined in claim 1, wherein at least a portion of the anchor element is molded into the rigid foam element.

6. The vehicular seat defined in claim 1, wherein the anchor element is coupled to the rigid foam element with an adhesive.

7. The vehicular seat defined in claim 1, wherein the anchor element is mechanically coupled to the rigid foam element.

8. The vehicular seat defined in claim 1, further comprising at a plurality of fastener elements, each fastener element configured to mechanically couple the anchor element to the rigid foam element.

9. The vehicular seat defined in claim 1, wherein the anchor element comprises at least one first flange portion configured to have a first flange major portion aligned substantially perpendicular with respect to a major surface of the rigid foam element.

10. The vehicular seat defined in claim 9, wherein the anchor element comprises at least one second flange portion configured to have a second flange major portion aligned substantially parallel with a rigid foam element major surface.

11. The vehicular seat defined in claim 1, wherein the anchor element has a substantially U-shaped configuration.

12. The vehicular seat defined in claim 1, wherein the rigid foam element is free of a metal frame element.

13. The vehicular seat defined in claim 1, wherein the rigid foam element has an indentation force deflection at 25% deflection of from about 500 pounds to about 2,500 pounds when measured pursuant to ASTM 3574-B1.

14. The vehicular seat defined in claim 1, wherein the rigid foam element is selected from the group consisting of polyurethane foam, expanded polypropylene, expanded polyethylene and expanded polystyrene.

15. The vehicular seat defined in claim 1, wherein the rigid foam element further comprises a pair of opposed reinforcing layers, each reinforcing layer coupled to a major surface of the rigid foam element.

16. The vehicular seat defined in claim 1, wherein the rigid foam element comprises a core layer positioned therein.

17. The vehicular seat defined in claim 16, wherein the core layer is a non-foam core layer.

18. The vehicular seat defined in claim 16, wherein the core layer is a non-foam core layer has a substantially honeycomb configuration.

19. The vehicular seat defined in claim 15, wherein each reinforcing layer comprises a fibrous reinforcing layer.

20. The vehicular seat defined in claim 2, wherein the automotive accessory is a child vehicular seat.

21. The vehicular seat defined in claim 1, wherein the attachment portion is configured to be coupled to a tether element of a child vehicular seat.

22. The vehicular seat defined in claim 1, wherein the rigid foam element has a density in the range from about 1.5 to about 24 pcf or from about 2.5 to about 12 pcf.

\* \* \* \* \*